(12) United States Patent
Loewenstein et al.

(10) Patent No.: US 8,877,669 B2
(45) Date of Patent: Nov. 4, 2014

(54) HYDROISOMERIZATION CATALYSTS FOR BIOLOGICAL FEEDSTOCKS

(75) Inventors: Michael A. Loewenstein, Solon, OH (US); Ahmad Moini, Princeton, NJ (US); Ivan Petrovic, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 466 days.

(21) Appl. No.: 13/193,890

(22) Filed: Jul. 29, 2011

(65) Prior Publication Data
US 2012/0065449 A1    Mar. 15, 2012

Related U.S. Application Data

(60) Provisional application No. 61/369,878, filed on Aug. 2, 2010.

(51) Int. Cl.
| | |
|---|---|
| B01J 29/06 | (2006.01) |
| B01J 27/182 | (2006.01) |
| C10G 3/00 | (2006.01) |
| B01J 37/08 | (2006.01) |
| C10G 65/04 | (2006.01) |
| C10G 45/64 | (2006.01) |
| B01J 29/85 | (2006.01) |
| B01J 29/74 | (2006.01) |
| C10G 45/62 | (2006.01) |
| C10G 45/02 | (2006.01) |
| C10L 1/02 | (2006.01) |
| B01J 37/02 | (2006.01) |
| B01J 23/755 | (2006.01) |
| B01J 23/40 | (2006.01) |
| B01J 23/89 | (2006.01) |

(52) U.S. Cl.
CPC ............. *B01J 29/7461* (2013.01); *C10G 3/49* (2013.01); *B01J 37/088* (2013.01); *C10G 65/043* (2013.01); *C10G 2300/1014* (2013.01); *C10G 45/64* (2013.01); *B01J 29/85* (2013.01); *B01J 2229/20* (2013.01); *B01J 29/7484* (2013.01); *C10G 45/62* (2013.01); *C10G 2400/02* (2013.01); *C10G 45/02* (2013.01); *C10G 2300/1018* (2013.01); *C10G 2400/06* (2013.01); *C10L 1/026* (2013.01); *B01J 37/0201* (2013.01); *Y02E 50/13* (2013.01); *C10G 3/47* (2013.01); *B01J 29/7469* (2013.01); *C10G 2400/08* (2013.01); *B01J 2229/42* (2013.01); *B01J 23/755* (2013.01); *B01J 29/7492* (2013.01); *B01J 23/40* (2013.01); *C10G 2400/04* (2013.01); *C10G 2400/10* (2013.01); *B01J 23/892* (2013.01); *C10G 3/50* (2013.01)
USPC .................. 502/60; 502/63; 502/64; 502/66; 502/69; 502/214

(58) Field of Classification Search
USPC ............................ 502/60, 63, 64, 66, 69, 214
See application file for complete search history.

(56) References Cited

U.S. PATENT DOCUMENTS

| | | | |
|---|---|---|---|
| 3,723,556 A | 3/1973 | Wilhelm | |
| RE29,857 E | 12/1978 | Argauer et al. | |
| 4,202,996 A | 5/1980 | Hilfman | |
| 5,676,912 A * | 10/1997 | Sharma et al. | ............. 423/213.2 |
| 5,800,698 A * | 9/1998 | Tejada et al. | ............. 208/216 R |
| 7,232,935 B2 | 6/2007 | Jakkula et al. | |
| 7,261,806 B2 | 8/2007 | Benard et al. | |
| 7,459,597 B2 | 12/2008 | Koivusalmi et al. | |
| 7,550,405 B2 | 6/2009 | Shan et al. | |
| 2007/0006523 A1 | 1/2007 | Myllyoja et al. | |
| 2007/0010682 A1 | 1/2007 | Myllyoja et al. | |
| 2007/0199302 A1 * | 8/2007 | Yavuz et al. | .................... 60/274 |
| 2007/0287871 A1 | 12/2007 | Brevoord et al. | |
| 2008/0066374 A1 | 3/2008 | Herskowitz | |
| 2008/0302001 A1 | 12/2008 | Koivusalmi et al. | |
| 2009/0318740 A1 | 12/2009 | Guillon et al. | |
| 2010/0089741 A1 | 4/2010 | Portnoff et al. | |

FOREIGN PATENT DOCUMENTS

EP    1396531    3/2007

* cited by examiner

*Primary Examiner* — Elizabeth Wood
(74) *Attorney, Agent, or Firm* — Melanie L. Brown

(57) ABSTRACT

Provided are hydroisomerization catalysts for processing a bio-based feedstock into biodiesel fuels. These catalysts comprise a catalytic material and a matrix component. The catalytic material is made up of a molecular sieve that has a pre-loaded platinum group metal. The catalytic material and the matrix component are processed together to form the hydroisomerization catalyst. Methods of making these hydroisomerization catalysts include synthesizing a molecular sieve; purifying the molecular sieve; associating the molecular sieve with a platinum group metal in the absence of the matrix component to form the pre-loaded molecular sieve before formation of a catalyst body; mixing the pre-loaded molecular sieve with the matrix component to form a mixture; processing the mixture to form a catalyst body; and drying and calcining the catalyst body to form the hydroisomerization catalyst. These hydroisomerization catalysts can be used to process hydrodeoxygenated plant- or animal-derived feeds to yield a biofuel.

16 Claims, No Drawings

HYDROISOMERIZATION CATALYSTS FOR BIOLOGICAL FEEDSTOCKS

CROSS-REFERENCE TO RELATED APPLICATIONS

This application claims the benefit of priority under 35 U.S.C. §119(e) to U.S. patent application No. 61/369,878, filed Aug. 2, 2010, which is hereby incorporated by reference in its entirety.

TECHNICAL FIELD

This invention pertains generally to catalysts used to form fuels and lubricants for combustion engines from biological feedstocks. More specifically, provided are hydroisomerization catalysts used to form diesel fuel from hydrodeoxygenated plant-derived oils or animal fats.

BACKGROUND

Biological feedstocks, such as plant- and animal-derived oils provide sources of renewable energy. These oils can be processed to form fuels and lubricants suitable for combustion engines. Typically, the oils are needed to be chemically rearranged in order to produce fuels and/or lubricants that can be used in and with, for example, gasoline and diesel engines. Such a process generally provides a first hydrotreating/hydrodeoxygenation step that breaks down the structure of the biological raw material to form linear paraffins and a second isomerization step that re-arranges the linear paraffins into branched compounds that provide suitable performance properties such as cetane, cloud point, and the like. For example, U.S. Pat. No. 7,232,935 (Jakkula) is directed to a process for producing a hydrocarbon component of biological origin, where the isomerization step operates using a counter-flow principle.

Molecular sieves, such as aluminosilicate zeolites and SAPO-type sieves, typically are used with precious metals and matrixes/binders to form catalysts for these types of processes. There is a continuing need to develop such catalysts in order to achieve high yields of desired fuel and/or lubricants along with desired performance properties.

SUMMARY

Provided are hydroisomerization catalysts for processing bio-based feedstocks into biodiesel fuels. These catalysts comprise a catalytic material and a matrix component, where the catalytic material comprises a molecular sieve comprising a pre-loaded platinum group metal. The catalytic material and the matrix component are processed together to form the hydroisomerization catalyst.

Also provided are hydroisomerization catalysts that comprise a pre-loaded molecular sieve and a matrix component for processing a bio-based feed into a biofuel made by the process of: synthesizing a molecular sieve; purifying the molecular sieve; associating the molecular sieve with a platinum group metal in the absence of the matrix component to form the pre-loaded molecular sieve before formation of the hydroisomerization catalyst; mixing the pre-loaded molecular sieve with the matrix component to form a mixture; processing the mixture to form a catalyst body; and drying and calcining the catalyst body to form the hydroisomerization catalyst.

Other aspects provide methods for making a biofuel, the methods comprising: providing a source of paraffins derived from a bio-based feed; contacting the hydrodeoxygenated bio-based feed with a hydroisomerization catalyst of the present invention; and yielding a biofuel. Bio-based feeds are generally plant- or animal-derived. Exemplary plant-derived oils are canola oil, castor oil, coconut oil, corn oil, cottonseed oil, hempseed oil, linseed oil, mustard oil, olive oil, palm oil, peanut oil, rapeseed oil, soy oils, soybean oil, sunflower oil, and combinations thereof. Exemplary animal-derived bio-based feeds include animal fats, greases, oils, and combinations thereof.

DETAILED DESCRIPTION

Provided are hydroisomerization catalysts for processing bio-based feeds into biodiesel fuels. Methods of making and using the same are also provided. These catalysts comprise a catalytic material and a matrix component. The catalytic material is made up of a molecular sieve that has a pre-loaded platinum group metal. The catalytic material and the matrix component are processed together to form the hydroisomerization catalyst. Reference to "pre-loaded" means that the molecular sieve is impregnated or otherwise associated with the platinum group metal in the absence of a matrix component and before calcination of the zeolite and/or formation of a catalyst body. It has been found that pre-loading of a platinum group metal, such as platinum, before mixing with the matrix component and forming the catalyst body results in a highly effective hydroisomerization catalyst, resulting in excellent yields for diesel fuel. Should it be desired, a platinum group metal can also be placed on the matrix.

The catalyst can comprise an overall platinum group metal amount that is the total of the amount of the pre-loaded platinum group metal and the amount of the matrix-based platinum group metal. In one or more embodiments, the platinum group metal is concentrated on the molecular sieve. That is, the majority of platinum group metal present in the hydroisomerization catalyst in its entirety has been associated with the molecular sieve. In one embodiment, 100% by weight of the platinum group metal is associated with the molecular sieve. In one or more embodiments, 51 to 99% by weight of the overall platinum group metal is located on the molecular sieve and 1 to 49% by weight of the overall platinum group metal is located on the matrix. Other embodiments provide that 99%, 95%, 90%, 85%, 80%, 75%, 70%, 65%, 60%, 55%, or even 51% by weight of the platinum group metal is associated with the molecular sieve.

As used herein, molecular sieves refer to materials, which have a substantially uniform pore distribution, with the average pore size being no larger than 20 Å. Zeolites are aluminosilicate crystalline materials having rather uniform pore sizes which, depending upon the type of zeolite and the type and amount of cations included in the zeolite lattice, typically range from about 3 to 10 Angstroms in diameter. SAPO-type molecular sieves refer to corner sharing tetrahedral frameworks where the majority of the tetrahedral sites are occupied by aluminum and phosphorus. Non-limiting examples of SAPO-type molecular sieves include silicoaluminophosphates and metal-aluminophosphates. Specific non-limiting examples include SAPO-11 and SAPO-41.

In a specific embodiment, the molecular sieve is a uni-dimensional pore zeolite, non-limiting examples of which include ZSM-12, ZSM-22, ZSM-23, ZSM-48, SAPO-11, and SAPO-41.

In another embodiment, the catalyst further comprises a promoter that can scavenge impurities, such as a base metal. Exemplary base metals include nickel, copper, iron, and tin.

The base metal can be present in an amount in the range of 0.1 to 10.0% (or 0.1 to 5%, or 0.1 to 3%) by weight of the catalyst.

In one or more embodiments, the pre-loaded platinum group metal comprises platinum, palladium, rhodium, ruthenium, or combinations thereof. A detailed embodiment provides that the pre-loaded platinum group metal comprises platinum that is present in an amount in the range of 0.1 to 2.0% by weight of the catalyst.

The matrix, or binder, component is one that binds with the pre-loaded molecular sieve to form the catalytic material. The matrix component can comprise a silica, an alumina, or combinations thereof. In a detailed embodiment, the matrix component is based on a material selected from the group consisting of: a silica sol, a hydroxylated alumina, a calcined alumina, an aluminophosphate, a silica, and combinations thereof. The hydroxylated alumina can be selected from the group consisting of boehmite, pseudo boehmite or gelatinous boehmite, diaspore, nordstrandite, bayerite, gibbsite, alumina having hydroxyl groups added to the surface and mixtures thereof. The calcined alumina can be selected from the group consisting of gamma, delta, theta, kappa, and rho alumina.

In one or more embodiments, the pre-loaded molecular sieve is present in an amount in the range of 20-80% by weight of the hydroisomerization catalyst and the matrix component is present in an amount in the range of 80-20% by weight of the hydroisomerization catalyst.

In another aspect, a hydroisomerization catalyst comprises a pre-loaded molecular sieve and a matrix component for processing a bio-based feed into a biofuel made by the process of: synthesizing a molecular sieve; purifying the molecular sieve; associating the molecular sieve with a platinum group metal in the absence of the matrix component to form the pre-loaded molecular sieve before formation of a catalyst body; mixing the pre-loaded molecular sieve with the matrix component to form a mixture; processing the mixture to form a catalyst body; and drying and calcining the catalyst body to form the hydroisomerization catalyst.

With regard to the synthesizing step to form the molecular sieve, a gel containing the desired framework ingredients is provided, where it is expected that an organic structure directing agent, also referred to as an organic template, is also present. The desired molecular sieve is then crystallized according to methods known in the art. In order to form an aluminosilicate zeolite, an aluminosilicate gel with an organic structure directing agent is used. For example, ZSM-23 can be formed from a gel having a Si:Al ratio in the range of 75:1 to 30:1, and an organic structure directing agent of pyrrolidine. The resulting crystals are then dried. The purifying step generally comprises filtering and washing the molecular sieve.

The step of associating the molecular sieve with a platinum group metal can be achieved by methods known in the art. For example, a platinum group metal can be associated with the molecular sieve by impregnation. Reference to "impregnation" means that a material is soaked with a precious metal-containing solution. In some embodiments, impregnation of platinum group metals is achieved by incipient wetness. In other embodiments, impregnation is achieved by ion exchange, where a platinum group metal ion exchanges with a cation of the molecular sieve. In yet other embodiments, the molecular sieve is processed by both incipient wetness and ion exchange. By impregnating the molecular sieve with the platinum group metal in the absence of the matrix component and before formation of the catalyst body, the metal can be concentrated on the molecular sieve rather than over a mixture of the molecular sieve and the matrix component. In some embodiments, however, it may be desirable to provide the matrix component with a platinum group metal associated with it too. This association with the matrix component can be done as desired during the manufacturing process. For example, the matrix component can be impregnated ahead of time, such as before it is mixed with the pre-loaded molecular sieve. Another alternative is to associate the platinum group metal with the catalyst body in its entirety (both the pre-loaded molecular sieve and the matrix component) after the catalyst body has been calcined.

After the pre-loaded molecular sieve and the matrix component are mixed, the mixture is processed to form a catalyst body. A preferred way to process the mixture is to extrude it through a shaping orifice to form an extruded catalyst body, or extrudate. Other catalyst bodies can be shaped into spheres or any other convenient formation.

The extrudate can be dried at a temperature in the range of 50-250° C. The extrudate can be calcined at a temperature in the range of 350-700° C., preferably in the range of 400-550° C.

Other aspects provide methods for making a biofuel, the method comprising: providing a hydrogenated plant-derived oil; contacting the hydrogenated plant-derived oil with a hydroisomerization catalyst of the present invention; yielding a biofuel. The plant-derived oil preferably comprises palm oil. A detailed embodiment provides that biofuel has a cloud point of −15° C. or lower.

Before describing several exemplary embodiments of the invention, it is to be understood that the invention is not limited to the details of construction or process steps set forth in the following description. The invention is capable of other embodiments and of being practiced or being carried out in various ways.

EXAMPLES

The following non-limiting examples shall serve to illustrate the various embodiments of the present invention.

Example 1

A hydroisomerization catalyst having a pre-loaded platinum component on the molecular sieve of ZSM-23 was prepared as follows.

A ZSM-23 (MTT structure) molecular sieve having a Si:Al ratio of 42 was formed from an aluminosilicate gel containing pyrrolidine as the organic structure directing agent. Upon crystallization, the ZSM-23 zeolite was recovered by filtration and washing. The zeolite was then dried at a temperature in the range of 100-110° C.

To pre-load the platinum, that is add the platinum before calcination, the dried zeolite was then impregnated with an ammoniacal Platinum "P" solution, aged for 30 minutes under ambient conditions, and dried at a temperature in the range of 70-110° C. The impregnated zeolite was then calcined at a temperature in the range of 400-550° C. The platinum loading of the calcined catalyst was approximately 0.5% by weight.

Example 2

Testing

The catalyst of Example 1, which was prepared by pre-loading the zeolite with platinum and then calcining, was tested in an autoclave experiment for hydroisomerization of normal hexadecane where it was observed that the 4.5 hour conversion was 47%. As a comparison, a first comparative catalyst with 0.5% weight platinum loading was obtained that had been was prepared by calcining the zeolite to remove the template and then impregnating with platinum. The first comparative catalyst provided a 35% conversion at 4.5 hours under the same test conditions. As such, the platinum pre-loaded ZSM-23 catalyst of Example 1 provided a roughly 35% increase in conversion of n-hexadecane. The autoclave experiment was performed with 1.3 weight % catalyst loading at 300° C. and 450 psig in $H_2$, agitated at 1500 rpm.

Example 3

An extruded hydroisomerization catalyst having a pre-loaded platinum component on the ZSM-23 molecular sieve and a binder of alumina was prepared as follows.

The ZSM-23 (MTT structure) molecular sieve having a Si:Al ratio of 42 of Example 1 was again formed from an aluminosilicate gel containing pyrrolidine as the organic structure directing agent. Upon crystallization, the ZSM-23 zeolite was recovered by filtration and washing. The zeolite was then dried at a temperature in the range of 100-110° C.

To pre-load the platinum, that is add the platinum before calcination and extrusion, the dried zeolite was then impregnated with an ammoniacal Platinum "P" solution, aged for 30 minutes under ambient conditions, and dried at a temperature in the range of 70-110° C. The material was then mixed with an alumina binder (70% by weight binder plus 30% by weight pre-loaded zeolite) and extruded to form catalyst extrudates with about 1/16 inches diameter and about 1/8-3/8 inches long. The extruded material was then dried and calcined at a temperature in the range of 400-550° C. The platinum loading of the calcined catalyst was approximately 0.5% by weight.

Example 4

Testing

The catalyst of Example 3, which was prepared by pre-loading the zeolite with platinum, extruding with alumina, and then calcining, was tested in a fixed bed reactor using n-hexadecane as the feedstock under the following conditions: temperature of 270-330° C., pressure of 450 psig, feed LHSV of 1 $hr^{-1}$, and $H_2/n-C_{16}$ of ~310 by volume. As a comparison, a second comparative catalyst was prepared as follows. A ZSM-23 molecular sieve having a Si:Al ratio of 48 was formed from an aluminosilicate gel containing pyrrolidine as the organic structure directing agent. Upon crystallization, the ZSM-23 zeolite was recovered by filtration and washing. The zeolite filter cake was dried at a temperature in the range of 100-110° C. and calcined at 550° C. for 6 hours. The final catalyst was then obtained by extruding the zeolite with alumina binder to form extrudates with about 1/16 inches diameter and about 1/8-3/8 inches long, calcining the extrudates at 400-550° C. and then impregnating the extrudates with 0.5 weight % platinum using Platinum "P" solution. After impregnation, the extrudates were again calcined at a temperature in the range of 400-550° C. As shown in Table 1, the catalyst of Example 3 had significantly higher activity at 300° C., giving 91% conversion versus only 50% conversion for the second comparative catalyst at the same temperature.

Example 5

In another example, an extruded hydroisomerization catalyst with a pre-loaded platinum component on an uncalcined ZSM-23 molecular sieve was prepared according to procedure of catalyst in Example 3, with platinum loading of approximately 0.15 wt. %.

Example 6

Testing

The catalyst of Example 5, which was prepared by pre-loading the uncalcined zeolite with platinum, extruding with alumina, and then calcining, was tested in a fixed bed reactor using n-hexadecane as the feedstock. Test conditions were the same as in Example 4. The second comparative catalyst of Example 4 was compared to the catalyst of Example 5. As shown in Table 1, the catalyst of Example 5, even with much lower Pt loading, had significantly higher activity at 300° C., giving 93% conversion as compared to only 50% conversion for the second comparative catalyst at the same temperature. Another performance advantage of the catalyst in Example 5 over the second comparative catalyst was much lower cracking at desired product cloud point of −15° C.: 12% vs. 27%, as presented in Table 2.

Example 7

In yet another example, an extruded hydroisomerization catalyst having a pre-loaded platinum component on the ZSM-23 molecular sieve and a binder of alumina was prepared as follows.

A ZSM-23 (MTT structure) molecular sieve having a Si:Al ratio of 55 was formed from an aluminosilicate gel containing pyrrolidine as the organic structure directing agent. Upon crystallization, the ZSM-23 zeolite was recovered by filtration and washing. The zeolite was then dried at a temperature in the range of 100-110° C.

To pre-load the platinum, that is add the platinum before calcination and extrusion, the dried zeolite was then impregnated with an ammoniacal Platinum "P" solution, aged for 30 minutes under ambient conditions, and dried at a temperature in the range of 70-110° C. The material was then mixed with an alumina binder (70% by weight binder plus 30% by weight pre-loaded zeolite) and extruded to form catalyst extrudates with about 1/16 inches diameter and about 1/8-3/8 inches long. Extrudates were then dried and calcined at a temperature in the range of 400-550° C. Platinum loading in the catalyst was approximately 0.15 wt. %.

Example 8

Testing

The catalyst of Example 7, which was prepared by pre-loading the uncalcined zeolite with platinum, extruding with alumina, and then calcining, was tested in a fixed bed reactor using n-hexadecane as the feedstock, under the same test conditions as in Example 4. The second comparative catalyst was compared to Example 7. As shown in Table 1, the catalyst of Example 7, even with higher Si:Al ratio and much lower Pt loading, had significantly higher activity at 300° C. giving 78% conversion vs. only 50% conversion for the second comparative catalyst at the same temperature. The catalyst of Example 7 also showed much lower cracking than the second comparative catalyst at the product cloud point of −15° C. (see Table 2).

TABLE 1

Conversion vs. Temperature

|  | Zeolite Si:Al | Pt Loading (wt. %) | Temp. (° C.) | Conversion (%) |
| --- | --- | --- | --- | --- |
| Example 3 | 42 | 0.5 | 300 | 91 |
| Example 5 | 42 | 0.15 | 300 | 93 |

TABLE 1-continued

Conversion vs. Temperature

| | Zeolite Si:Al | Pt Loading (wt. %) | Temp. (° C.) | Conversion (%) |
|---|---|---|---|---|
| Example 7 | 55 | 0.15 | 300 | 78 |
| Second Comparative Catalyst | 48 | 0.5 | 300 | 50 |

TABLE 2

Cracking vs. Cloud Point

| | Zeolite Si:Al | Cloud Point (° C.) | Cracking (%) |
|---|---|---|---|
| Example 5 | 42 | −15 | 12 |
| Example 7 | 55 | −15 | 10 |
| Second Comparative Catalyst | 48 | −15 | 27 |

Example 9

A series of hydroisomerization catalysts having pre-loaded platinum and nickel components in varying amounts on the molecular sieve of ZSM-23 were prepared as follows.

A ZSM-23 (MTT structure) molecular sieve having a Si:Al ratio of 39 was formed from an aluminosilicate gel containing pyrrolidine as the organic structure directing agent. Upon crystallization, the ZSM-23 zeolite was recovered by filtration and washing. The zeolite was then dried at a temperature in the range of 100-110° C.

To pre-load the platinum and nickel, that is add the platinum and nickel before calcination, the dried zeolite was then impregnated with an ammoniacal solution of Platinum "P" and nickel nitrate, aged for 30 minutes under ambient conditions, and dried at a temperature in the range of 80-110° C. The impregnated zeolite was calcined at a temperature of 400° C. in air and then reduced at a temperature of 400° C. with a forming gas of $H_2/N_2$ and then passivated with dilute air.

Example 10

Testing

The catalysts of Example 9 having varying levels of nickel and platinum were tested in an autoclave experiment for hydroisomerization of n-hexadecane under the same conditions as in Example 2. These Ni-Pt catalysts were compared with a Pt-only catalyst prepared according to Example 1. The test results of Table 3 show that as nickel content increased, increases in conversion and mono-branching occurred and a decrease in cracking occurred.

TABLE 3

Pt-only catalyst vs. Pt—Ni catalyst

| # | % Pt by wt | % Ni by wt | % Conversion (4.5 hr) | Mono-Br: % of Total Area | Di-Br: % of Total Area | Cracking: % of Total Area |
|---|---|---|---|---|---|---|
| Example 1 | 0.5 | 0 | 47.3 | 82.5 | 5.5 | 11.9 |
| Sample 9A | 0.5 | 0.125 | 49.9 | 85.8 | 3.6 | 10.6 |
| Sample 9B | 0.5 | 0.5 | 48.0 | 87.4 | 4.0 | 8.6 |
| Sample 9C | 0.5 | 2 | 52.3 | 86.0 | 5.2 | 8.8 |
| Sample 9D | 0 | 2 | 25.5 | 86.5 | 3.7 | 9.8 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A hydroisomerization catalyst for processing a bio-based feed into biodiesel fuels comprising:
    a catalytic material comprising a uni-dimensional pore zeolite comprising a pre-loaded platinum group metal; and
    a matrix component;
    wherein the catalytic material and the matrix component are processed together to form the hydroisomerization catalyst.

2. The catalyst of claim 1, wherein the uni-dimensional pore zeolite is selected from the group consisting of ZSM-12, ZSM-22, ZSM-23, ZSM-48, SAPO-11, and SAPO-41.

3. The catalyst of claim 1, further comprising a nickel component.

4. The catalyst of claim 3, wherein the nickel is present in an amount in the range of 0.1 to 10.0% by weight of the catalyst.

5. The catalyst of claim 1, wherein the pre-loaded platinum group metal comprises platinum, palladium, rhodium, ruthenium, or combinations thereof.

6. The catalyst of claim 1, wherein the pre-loaded platinum group metal comprises platinum that is present in an amount in the range of 0.1 to 2.0% by weight of the catalyst.

7. The catalyst of claim 1, wherein the matrix component further comprises a matrix-based platinum group metal selected from the group consisting of platinum, palladium, rhodium, ruthenium, or combinations thereof.

8. The catalyst of claim 1, wherein the matrix component comprises a silica, an alumina, or combinations thereof.

9. The catalyst of claim 1, wherein the matrix component is based on a material selected from the group consisting of: a silica sol, a hydroxylated alumina, a calcined alumina, an aluminophosphate, a silica, and combinations thereof.

10. The catalyst of claim 9, wherein the hydroxylated alumina is selected from the group consisting of boehmite, pseudo boehmite or gelatinous boehmite, diaspore, nordstrandite, bayerite, gibbsite, alumina having hydroxyl groups added to the surface and mixtures thereof.

11. The catalyst of claim 9, wherein the calcined alumina is selected from the group consisting of gamma, delta, theta, kappa, and rho alumina.

12. The catalyst of claim 1 comprising the pre-loaded uni-dimensional pore zeolite in an amount in the range of 20-80% by weight of the hydroisomerization catalyst and the matrix component in an amount in the range of 80-20% by weight of the hydroisomerization catalyst.

13. A hydroisomerization catalyst that comprises a pre-loaded uni-dimensional pore zeolite and a matrix component for processing a bio-based feed into a biofuel made by the process of:

synthesizing a uni-dimensional pore zeolite;
purifying the uni-dimensional pore zeolite;
associating the uni-dimensional pore zeolite with a platinum group metal in the absence of the matrix component to form the pre-loaded uni-dimensional pore zeolite before forming a catalyst body;
mixing the pre-loaded uni-dimensional pore zeolite with the matrix component to form a mixture;
processing the mixture to form a catalyst body; and
drying and calcining the catalyst body to form the hydroisomerization catalyst.

14. The method of claim 13, wherein the synthesizing step comprises mixing an aluminosilicate gel and an organic structure directing agent, crystallizing the uni-dimensional pore zeolite, and drying the uni-dimensional pore zeolite.

15. The method of claim 13, wherein the purifying step comprises filtering and washing the uni-dimensional pore zeolite.

16. The method of claim 13, wherein the extrudate is dried at a temperature in the range of 50-250° C. and is calcined at a temperature in the range of 350-700° C.

* * * * *